United States Patent [19]
Ozawa

[11] 4,239,445
[45] Dec. 16, 1980

[54] POSITIONING APPARATUS FOR TRANSFERRING PALLETS

[75] Inventor: Fumihiro Ozawa, Narashino, Japan

[73] Assignee: Seiko Seiki Kabushiki Kaisha, Chiba, Japan

[21] Appl. No.: 843,681

[22] Filed: Oct. 19, 1977

[30] Foreign Application Priority Data

Oct. 19, 1976 [JP] Japan .................. 51-125230

[51] Int. Cl.³ ............................................. B65G 47/74
[52] U.S. Cl. .................................. 414/749; 29/430;
83/416; 104/48; 104/172 BT; 198/345; 269/56; 414/677
[58] Field of Search ............. 104/35, 48, 96, 172 BT;
198/345, 478; 269/56, 63; 83/416; 214/1 R, 1
F, 152, 1 B, 1 BB; 29/429, 430; 414/750-753,
749, 222, 677, 787

[56] References Cited

U.S. PATENT DOCUMENTS

| 761,478 | 5/1904 | Hanretty | 104/110 X |
|---|---|---|---|
| 2,249,230 | 7/1941 | Schafer | 198/345 |
| 2,622,745 | 12/1952 | Roe | 214/1 F |
| 2,955,347 | 10/1960 | Zajac | 214/1 R X |
| 2,988,234 | 6/1961 | Baruthy et al. | 214/1 BB |
| 3,370,494 | 2/1968 | Schenck | 198/345 X |
| 3,774,546 | 11/1973 | Krammer | 104/172 BT X |
| 3,887,351 | 6/1975 | Dahlman et al. | 198/345 X |
| 3,888,341 | 6/1975 | Konkal | 198/345 |
| 3,968,869 | 7/1976 | Stalker | 214/1 B X |

FOREIGN PATENT DOCUMENTS 2022973 11/1970 Fed. Rep. of Germany .... 104/172 BT

*Primary Examiner*—Frank E. Werner
*Attorney, Agent, or Firm*—Robert E. Burns; Emmanuel J. Lobato; Bruce L. Adams

[57] ABSTRACT

A pallet positioning apparatus including a bed having guide members mounted thereon which define a pallet transfer path. A pallet traveling along the guide members includes a positioning pin on the lower surface of the pallet. A positioning lever rotatably mounted on the bed includes a roller and a member having a base surface opposite the roller mounted at an end of the positioning lever. The lever is biased to engage the pallet positioning pin for positioning the pallet on the guide members. The positioning lever is rotatable for releasing the pallet positioning pin. A clamping device clamps the pallet in position after the positioning pin has been engaged to fix the pallet in position.

2 Claims, 7 Drawing Figures

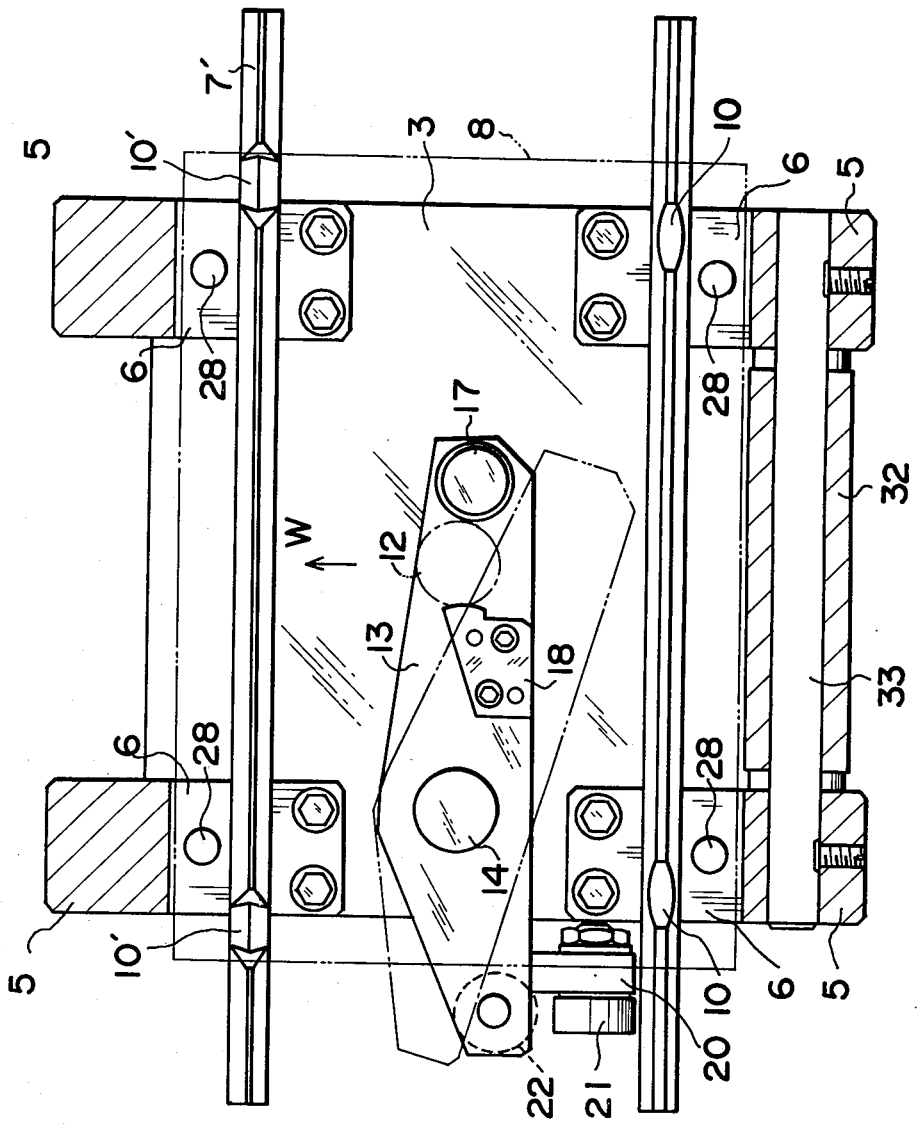

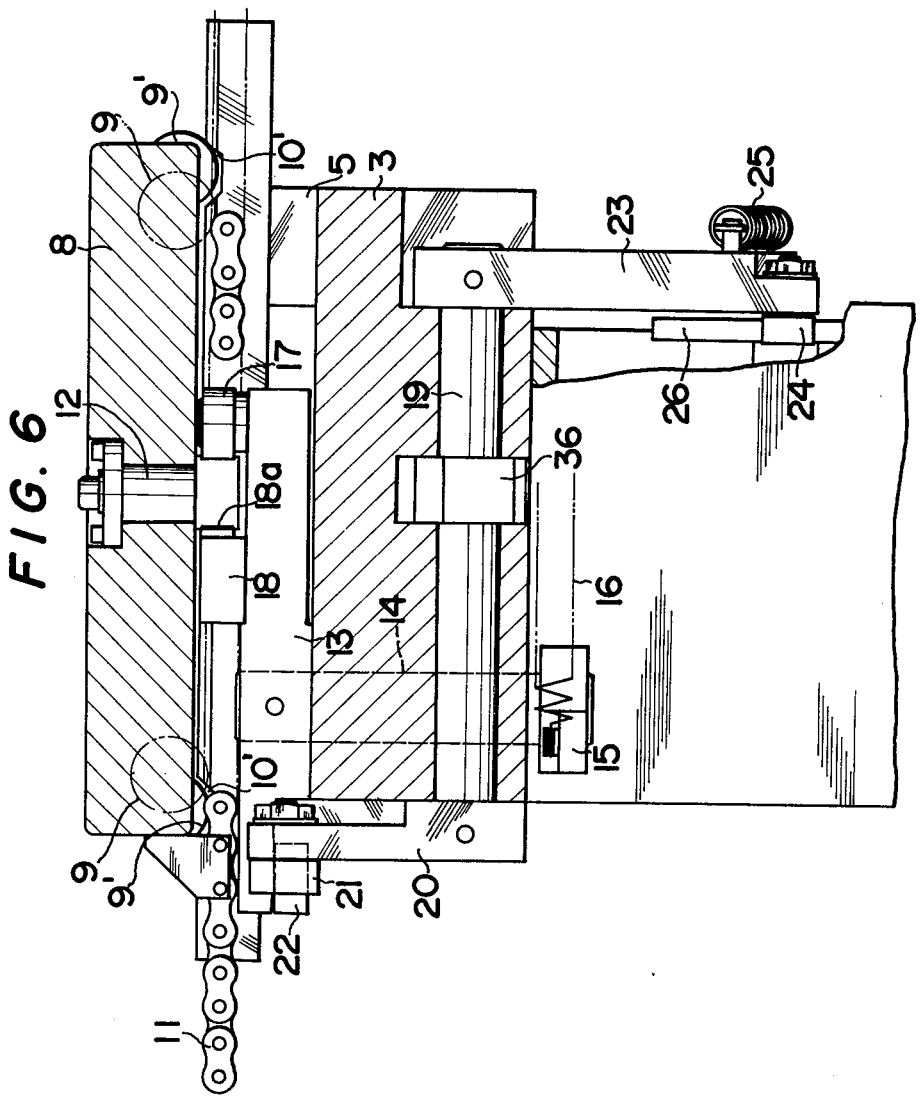

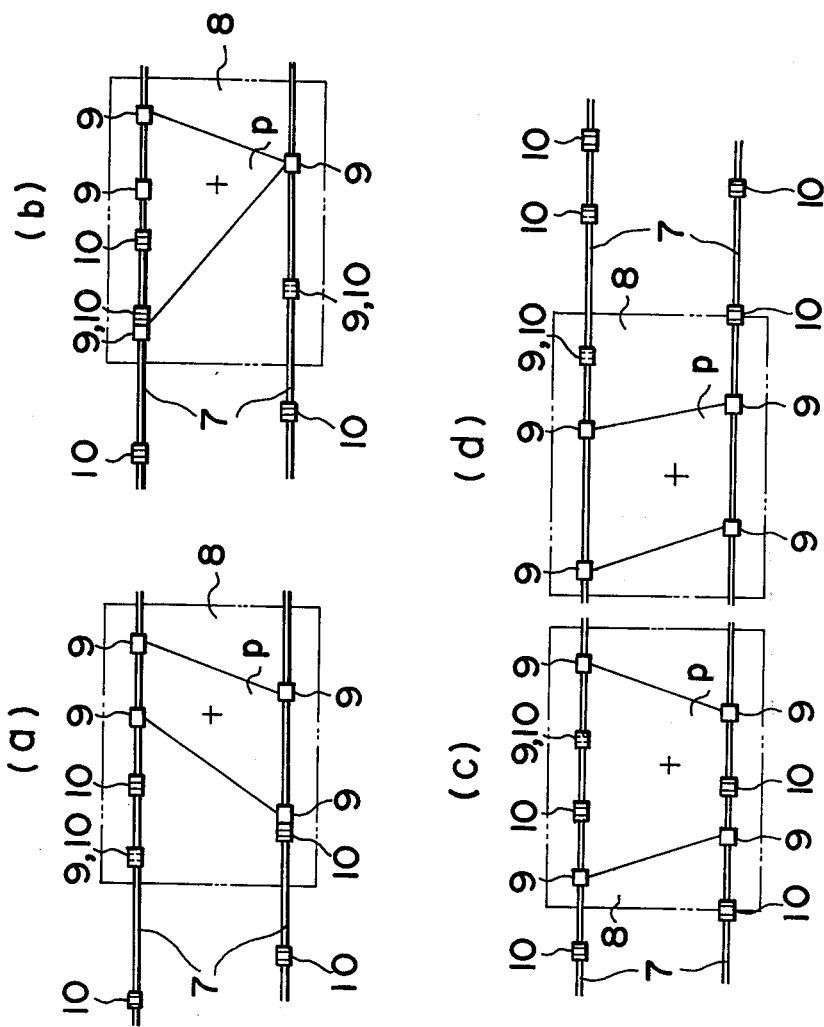

POSITIONING APPARATUS FOR TRANSFERRING PALLETS

BACKGROUND OF THE INVENTION

This invention relates to a novel improvement of positioning apparatus for transferring pallets in a linear station machine or the like. Generally, a transfer machine such as a linear station machine or the like is used to perform necessary working operations by the various working units arranged along both sides thereof. And the transfer of works or workpieces is commonly performed by the pallets carrying jig plates thereon.

The conventionally linear station machine of pallets-transfer type has a pallet transfer track such as a dovetailed groove continued for defining a transfer direction on the bed thereof, and also every pallet has a sliding surface for sliding along that of said transfer track.

These sliding surfaces are simultaneously used as base surfaces for the positioning of pallets so that the sliding surfaces must be finished with high accuracy and it is a danger that chips will lodge between these sliding surfaces and cause wear or decrease the finishing accuracies of the works. Furthermore, it requires a lubricating system comprised of a highly complicated mechanism to decrease abrasions and sticking of said sliding surfaces.

SUMMARY OF THE INVENTION

The object of the present invention is to furnish a positioning apparatus for transferring pallets which features separation of the base surfaces for positioning pallets and the sliding surfaces for guide ways thereof and which is provided with a positioning pin and more than four transferring tools, such as rollers, on the under surface of every pallet. On the guide way side of every pallet is provided base pins to restrict the upper and lower directional position of every pallet, and notched portions to receive said transferring tools and wherein the upper and lower directional positioning of every pallet is performed by positioning said transferring tools in said notched portions and contacting the positioning pins with the base pins, when pallets reach every stationary or fixed position when transferring pallets along the guide way.

BRIEF DESCRIPTION OF THE DRAWINGS

FIG. 5 is a sectional plan thereof.

FIG. 6 is a sectional side view thereof and

FIG. 7 illustrates the principles of the transferring tools according to this invention.

DESCRIPTION OF THE PREFERRED EMBODIMENT

Hereafter, the preferred embodiment of this invention will be described in detail according to the drawings.

Figure 1:
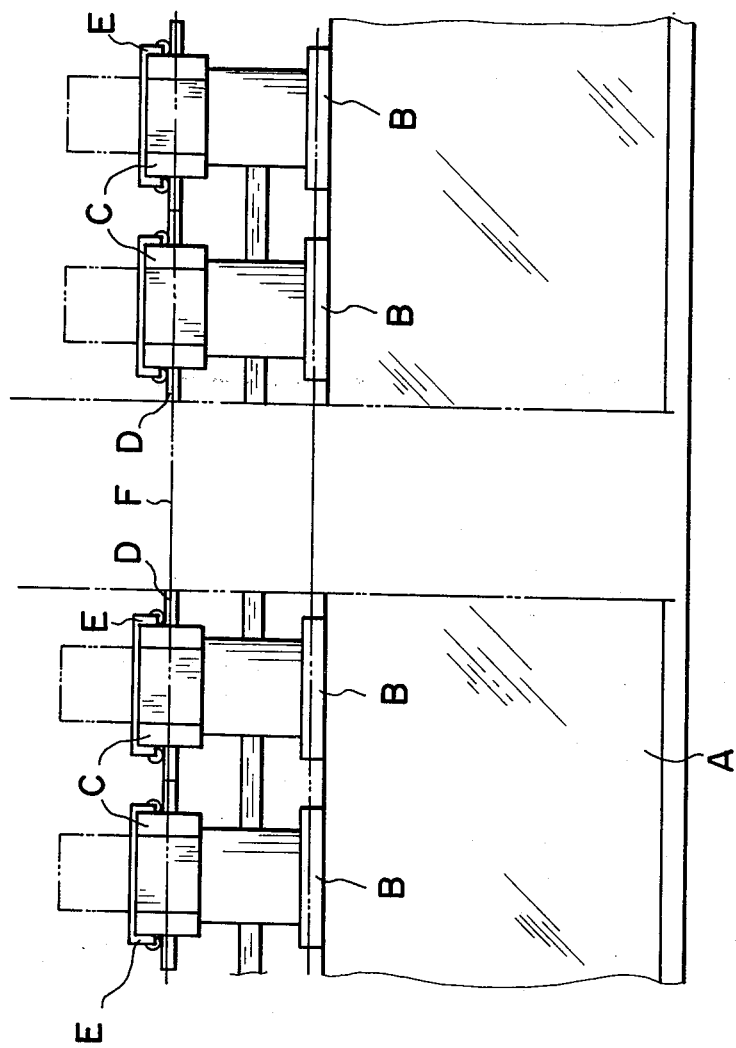
FIG. 1 is an outlined front view of a linear station machine composed using the positioning apparatus for transferring pallets.
Figure 2:
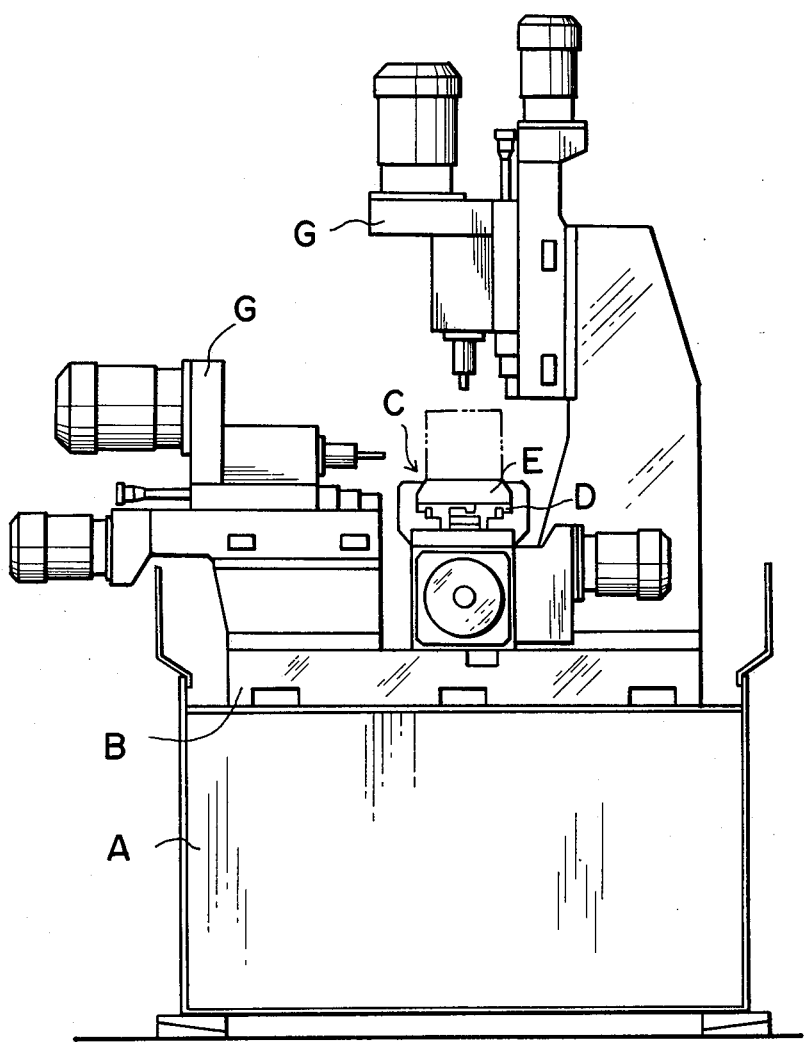
FIG. 2 is an outlined side view thereof.

FIG. 1 and the FIG. 2 are outlined figures of a linear station machine composed using these pallet positioning units. "A" is a lower machine base and "B" is one of the base plates mounted thereon at every position of a working station and "C" is one of the positioning units mounted on the center portion of a respective base plate "B". A continuous pallet transfer track can be composed by arranging the positioning units in a single line so as to connect every pallet guide way "D" between every station which is mounted on the upper portion of said positioning unit "C".

"E" is one of the pallets for transferring works to move along said guide ways "D" for pallets and is transferred intermittently by some transfer means such as chains or the like. "G" is one of the working units arranged in both sides of said positioning units of "C" for pallets at every working station and the positioning units "C" and the working units "G" are arranged with accurate positioning on said base plates "B" at every working station.

Figure 3:
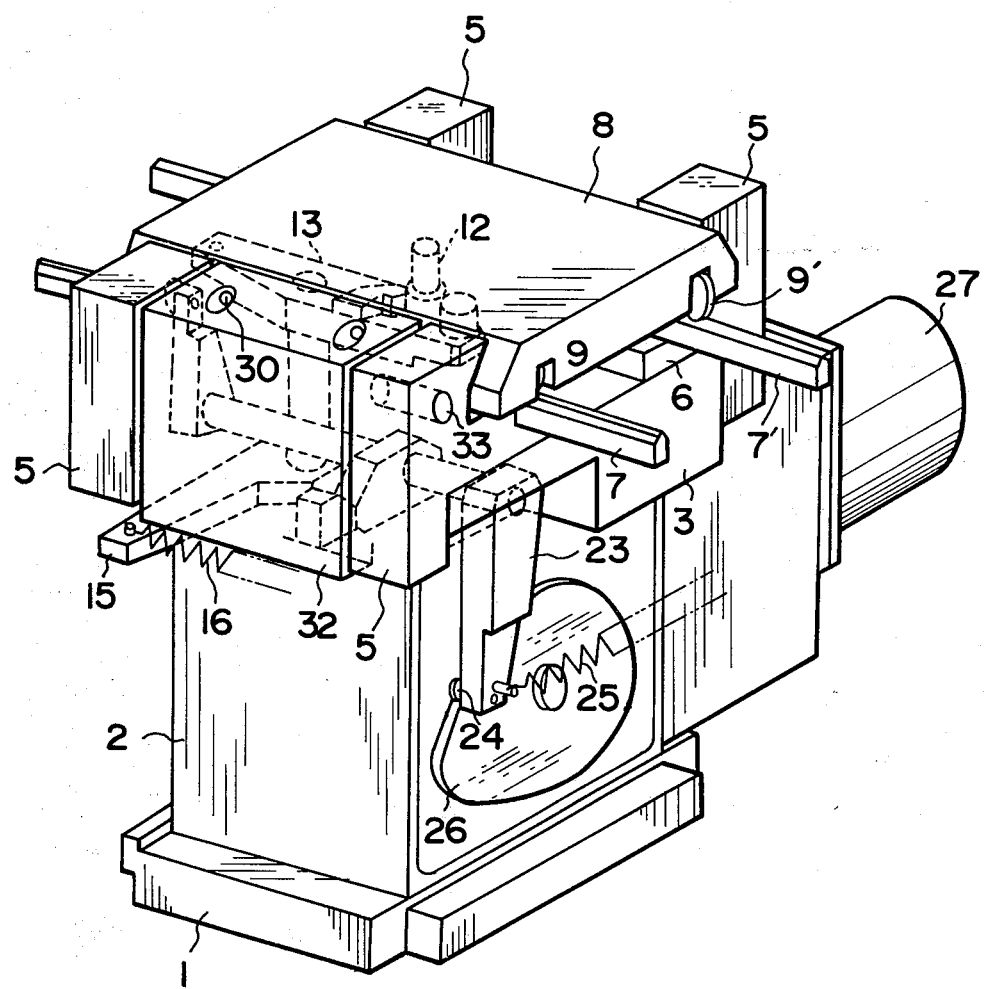
FIG. 3 is a perspective view of a positioning unit provided with the positioning apparatus of pallet according to this invention.

FIG. 3 shows an external view of said positioning unit, wherein "1" is a frame and "2" is a base block mounted on the frame "1" and "3" is a bed fixed on the base block "2". Four stationary arms "5" are fixed to the four corners of said bed "3" respectively. And a horizontal flat portion "6" is formed in said every fixed arm "5" and the under surface of said every horizontal flat portion "6" is contacted by the upper surface of said bed "3" and also two rails "7&7'" are laid parallel to each other on the upper surface of every horizontal flat portion "6" along the transferring direction of the pallet and further the top portions of said rails "7&7'" are formed in reversed V-shapes so as not to receive chips thereon.

Figure 4:
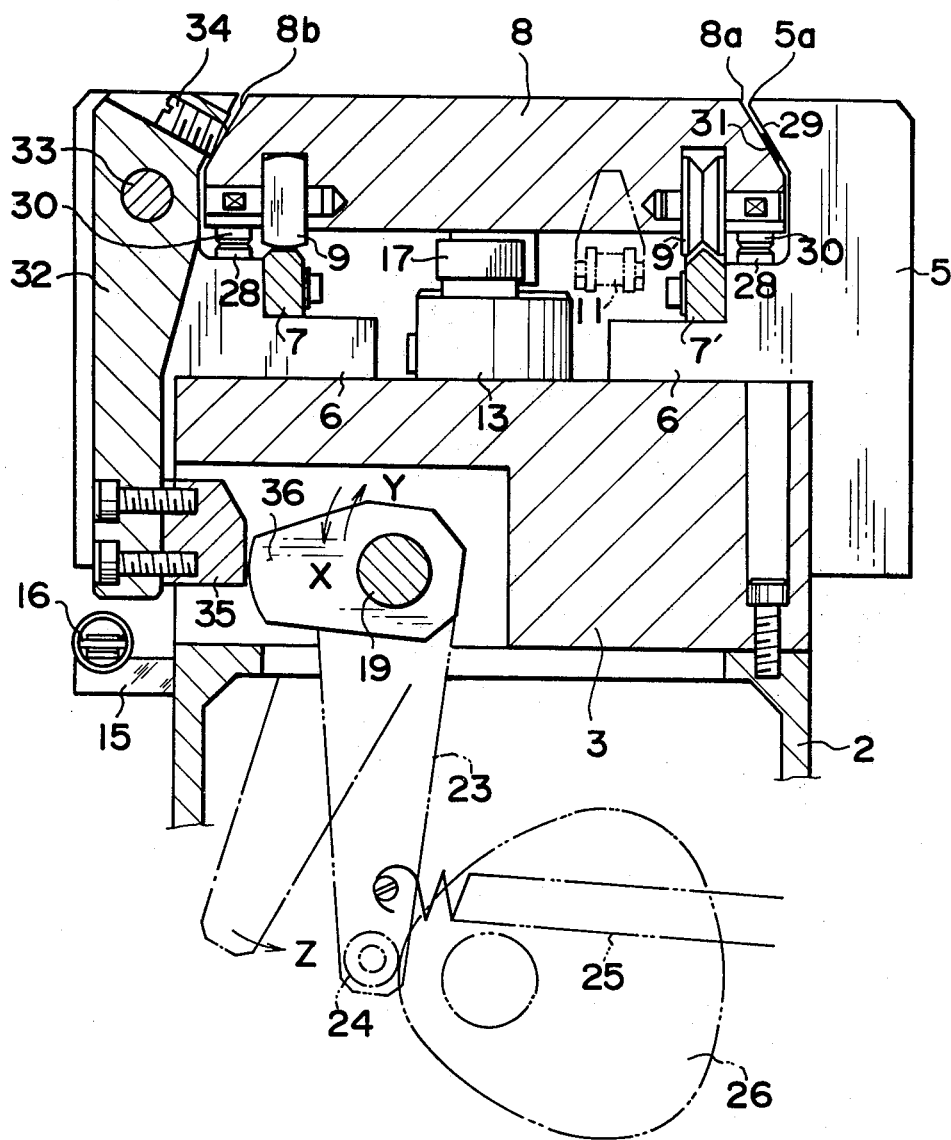
FIG. 4 is a front view with partial section.

"8" is a pallet to be carried movable on the rails "7&7'" through the rollers "9" and "9'", wherein the rollers "9" mounted on the one side of the pallet "8" are flat rollers as shown in FIG. 4 and contacted by the top of rail "7" and wherein the other rollers "9'" mounted on the opposite side thereof are V-grooved rollers and contacted by the cheveron slopes of said rail "7'" whereby the pallet "8" does not run off the rails "7&7'". And on the said bed "3" the notched portions "10&10'" and the same "10'&10'" correspond with the rollers "9&9" and the same "9'&9'" which are positioned at the contact portions of the rails "7&7'", and when these notched portions "10,10', ... " are meshed or in registration the said rollers "9,9', ... ", the pallet "8" drops thereinto and the rough positioning along the pallet transferring direction is performed thereby. The said pallet "8" is intermittently transferred by a transfer chain "11" driven with a driving unit not shown in drawings.

And the interval between said notched portions "10" and "10" is formed narrower than that between said notched portions "10'" and "10'". This condition is for the purpose of not matching the rollers "9,9'" with the notched portions "10,10'" simultaneously when the front rollers "9,9'" of the pallet "8" pass through the notched portions "10,10'" and travel from the bed "3" at the time of transferring the pallet "8" on the bed "3" and also when the rear rollers "9,9'" of the pallet "8" pass through the front notched portions "10,10'" of the rails "7,7'". Accordingly, a minimum of three rollers among the four rollers 9,9' are always in contact with the rails "7,7'", so that bumpy motions of the pallet "8" during the time of transferring thereof are prevented.

The notched portions are formed four at a minimum on the surfaces of the guide ways, and all the notched portions are placed opposite a respective roller (transferring tool) and all these rollers drop thereinto at the position of the pallet "8" to be suspended, but during the time the pallet "8" is in transferring way, when one of the optional rollers comes into a position opposite any notched portion, the polygon areas (P shown in FIG. 7) formed by lines extending between the other rollers except for opposed ones include the center of gravity of the pallet. According to such an arrangement of transferring tools and the notched portions, the pallet during transfer does not bump due to the notched portions and can smoothly travel along the rails.

"12" is a cylindrical positioning pin fixed vertically on the under surface of said pallet "8" and "13" is a positioning lever arranged horizontally between the pallet "8" and the bed "3" and approximately the center portion thereof is fixed to the end of a rotating shaft "14" mounted through the bed "3" vertically. "15" is an arm fixed on the lower end of said rotating shaft "14" and a spring "16" is stretched between the outer end of said arm "15" fixed to the rotating shaft "14" and said base block "2", so that said positioning lever "13" is always charged or biased in the counter clockwise direction by the tensile force of the spring "16".

"17" is a roller mounted on the end portion of the positioning lever "13" just aside the positioning pin "12" on the under surface of the pallet and "18" is a base piece fixed on the upper surface of the positioning lever "13" and located at a proper interval from said roller "17". The front end surface of the base piece "18" is formed in a circular arc shaped standard surface "18a" and the interval between said standard suface "18a" and the external circumference of said roller "17" is held slightly narrower than the outside diameter of the positioning pin "12". Then, when the positioning lever is rotated to the counter clockwise direction by the spring force of said spring "16" so as to force the positioning pin "12" into the interval between the standard piece "18a" and the roller "17" and to press the pallet "8" to the direction of arrow mark W (shown in FIG. 5), the positioning of the pallet "8" in front & rear and right & left directions is precisely performed.

"19" is an operating shaft passed through said bed "3" along the front and rear direction and "20" is an operating arm and "21" is a roller mounted rotatably on the end of the operating arm "20" which is optionally contactable with a roller "22"0 mounted on the under surface of the rear end of the positioning lever "13". And a cam following lever "23" is fixed on the front end of said operating shaft "19" and a cam follower "24" is mounted on the end portion of this cam following lever "23" and the cam follower lever is always charged or biased in the counter clockwise direction by a spring "25" stretched between the front end portion of the cam following lever "23" and the base block "2".

"26" is a clamping cam supported rotatably on the base block "2" and the cam lead surface thereof is contacted by the cam follower "26". And this clamping cam "26" is rotated by a driving motor "27" through a worm shaft (not shown in figure).

"28,28, ... " are positioning base pins for the vertical direction fixed on the horizontal flat portions "6,6, ... " of the stationary arms "5,5, ... " and "29,29, ... " are positioning base pins for the longitudinal direction fixed on the inclined inside walls "5a" of the stationary arms "5,5, ... " and "30,30, ... " are positioning pins fixed on the under surface of the pallet "8" at the four corners thereof corresponded to said base pins "28,28, ... " and "31,31, ... " are also positioning pins fixed on the right side inclined surface "8a" of the pallet "8" corresponded to the positions of the base pins "29,29, ... ". And when the rollers "9,9', ... " are meshed with and dropped into the notched portions "7,7'. ... ", the pallet "8" is supported by the said base pins "28,28 ... " (refer to FIG. 4).

"32" is a clamping arm arranged between right side stationary arms "5" and "5" and this clamping arm "32" is supported rotatably by a clamping shaft "33" longitudinally supported between said stationary arms "5" and "5". "34,34" are clamping pins screw fitted on the upper portions of the clamping arm "32" and these clamping pins "34,34" are screw fitted vertically relative to the left-side inclined surface "8b" of said pallet "8" and are adjustable in the axial direction thereof. "35" is a contact block fixed on the center of the lower portion of the clamping arm "32" and is contacted by the circular arc shaped end of a clamping lever "36" fixed on the middle portion of the operating shaft "19". And when the operating shaft "19" is rotated to the direction of arrow mark X followed by rotation of the clamping cam "26", the clamping lever "36" makes the clamping arm "32" rotate in a direction effective to push the contact block "35" thereby, so that the pallet "8" is firmly set between the base pins "28,28 ... " and the base pins "29,29". Further, when the clamping lever "36" parts from the contact block "35" in response to rotation in the direction of arrow mark Y, the pallet "8" becomes free upon removing the pushing force of the clamping arm "32".

Hereafter the operation of the structure mentioned above will be described.

Now, the pallet "8" is transfered on the bed "3" through the rails "7,7'" by the chain "11" and when the rollers "9,9', ... " are meshed with the notched portions "10,10', ... " on the rail "7,7'", the pallet "8" drops slightly down and the positioning pins "30,30, ... " are contacted by the base pins "28,28 ... " and also supported by these contacts of the pins. After these condition is set, the running of the chain "11" is stopped and also the driving motor "27" makes the clamping arm "26" rotate. At this time, the cam follower "24" is contacted by the largest cam-lead position of the clamping cam "26" and the cam following lever "23" assumes a position as shown by the one dot-dash line in FIG. 4. And then from this condition, the cam following lever "23" gradually rotates with the rotation of the clamping cam "26" in the direction of arrow mark Z by the spring "25" and thereby this rotation is transmitted to the operating arm "20" through the operating shaft "19" and makes the operating arm "20" rotate in the same direction. Whereupon the roller "21" mounted on the end portion of the operating arm "20" moves in a direction to withdraw from the pallet "8". On the other hand the positioning lever "13" is always charged in the counterclockwise direction by the force of the spring "16", so that when the roller "21" contacted by the roller "22" is moved as described above, the positioning lever "13" is rotated in the counterclockwise direction from the position shown by dashed lines in FIG. 5. Then, the positioning lever "13" presses the roller "17" and the standard positioning piece "18" to the positioning pin "12" on the pallet "8" in order to force the positioning pin "12" into the interval between the standard piece "18" and the roller "17" and in press the pallet "8" in the direction of arrow mark W and thereby the positioning operation in the left and right direction is performed by contacting the positioning pins "31,31"

of the pallet "8" with the base pins "29,29" fixed on the stationary arms "5,5". The positioning operation in the front and rear direction of the pallet "8" is performed by the standard surface "18a" of the positioning standard piece "18".

After the positioning operation of the pallet "8" has been performed in response to the positioning lever "13" having pressed the pallet "8" by the spring force of the spring "16", the positioning lever "13" does not rotate beyond this point. But the cam following lever "23" rotates further to follow the clamping cam "26", so that the roller "21" of the front end of the operating arm "20" parts from the roller "22" of the rear end of the positioning lever "13" and also the clamping lever "36" fixed on the middle portion of the operating shaft "19" rotates in the direction of arrow mark X as shown in FIG. 4 accompanying the rotation of cam following lever "23" and becomes in contact with the contact block "35" fixed on the lower end of the clamping arm "32". And after the clamping lever "36" contacts the contact block "35" and presses more to make the clamping arm "32" rotate in the clockwise direction, the clamping arm "32" presses the pallet "8" in the obliquely under direction and also presses & fixes strongly the pallet "8" against the positioning pins "28,28" and the base pins "29,29", with the result that the precise positioning operation may be performed at the same time.

And after the positioning and fixing operation of every working station has been performed as mentioned above, the works on the pallets were conducted to the appointed fabrication operations and after completing these operations the fixed condition of the pallets "8" are released by the reversed operations of the above ones and the pallets "8" are step-fed to the next station. After the rollers ascend the slopes of the notched portions and the vertical positioning pins make the base pins separate, the pallets are transferred smoothly with the rollers guided by the rails.

Furthermore, the above embodiment has described for the case having four rollers as transferring tools, but if more than five rollers and corresponding notched portions thereof are used, the center of gravity of transferring pallets are always placed within the polygon area formed by the transferring tools on the guide ways as apexes and therefore the transfer operation of the pallets becomes more smooth.

As described above, the positioning apparatus for transferring a pallet according to this invention provides the positioning pin on the under surface of the pallet and more than four transferring tools and also provides the notched portions at every position of said transferring tool of the pallet fixed position on the guide surfaces, and when the pallet is placed in said fixed position, the pallet is slightly descended by means of meshing every transferring tool with every notched portion and the pallet is positioned in the vertical direction according as the positioning pin comes into contact with the base pin. Therefore this positioning apparatus can maintain a precise positioning operation and a smooth transferring operation for a long term without bumpy motion of the transferring pallet, slipping out work on the pallet or damaging the positioning pin by striking it against some obstacles on the guide surface.

What is claimed is:

1. A pallet positioning apparatus, for use in a linear station machine or the like, comprising: a bed having an upper surface; guide members defining a pallet transfer path mounted on the upper bed surface; a pallet having a lower surface including means for cooperating with said guide members to allow said guide members to guide said pallet travelling along said guide members, and a positioning pin mounted on the lower surface of said pallet; means for advancing said pallet along the pallet transfer path; a positioning lever rotatably mounted on said bed and having a longitudinally extending axis located intermediate said guide members, a roller mounted at the end of said positioning lever, and a member having a base surface mounted on said positioning lever adjacent said roller and defining a space therebetween dimensioned to receive said pallet positioning pin; biasing means for biasing said positioning lever to rotate for engaging said positioning pin on the lower surface of said pallet between said roller and said base surface opposite said roller for stopping said pallet on said guide members; and means for rotating said positioning lever to disengage said positioning pin to release said pallet.

2. A pallet positioning apparatus according to claim 1 further comprising clamping means mounted on said bed for clamping said pallet in position after said positioning pin has been engaged to fix said pallet in position on the pallet transfer path.

* * * * *